(12) United States Patent
Jones et al.

(10) Patent No.: US 8,150,228 B2
(45) Date of Patent: Apr. 3, 2012

(54) ACID BLOCK FOR HYBRID SILICON DEVICE PROCESSING COMPATIBLE WITH LOW-LOSS WAVEGUIDES

(76) Inventors: Richard Jones, San Mateo, CA (US); Alexander W. Fang, Los Angeles, CA (US)

( * ) Notice: Subject to any disclaimer, the term of this patent is extended or adjusted under 35 U.S.C. 154(b) by 315 days.

(21) Appl. No.: 12/346,779

(22) Filed: Dec. 30, 2008

(65) Prior Publication Data

US 2010/0166360 A1    Jul. 1, 2010

(51) Int. Cl.
*G02B 6/10* (2006.01)
*G02B 6/00* (2006.01)

(52) U.S. Cl. ........... 385/129; 385/132; 385/141; 385/14

(58) Field of Classification Search .................. None
See application file for complete search history.

(56) References Cited

U.S. PATENT DOCUMENTS

| 6,801,702 B2 * | 10/2004 | Day ................. 385/130 |
| 7,315,679 B2 * | 1/2008 | Hochberg et al. ........ 385/129 |
| 2002/0126976 A1 * | 9/2002 | Day ................. 385/130 |
| 2006/0233504 A1 * | 10/2006 | Hochberg et al. ........ 385/129 |

* cited by examiner

*Primary Examiner* — Charlie Peng
*Assistant Examiner* — Mary El Shammaa
(74) *Attorney, Agent, or Firm* — Cool Patent, P.C.; Joseph P. Curtin

(57) ABSTRACT

An acid-stop structure for a rib waveguide comprises a fin structure formed between the sidewalls in each rib channel of the rib waveguide, thereby preventing acids and other etchants from flowing down the rib channel and under a die that has been bonded to a wafer.

17 Claims, 5 Drawing Sheets

US 8,150,228 B2

ACID BLOCK FOR HYBRID SILICON DEVICE PROCESSING COMPATIBLE WITH LOW-LOSS WAVEGUIDES

TECHNICAL FIELD

The subject matter disclosed herein generally relates to the field of semiconductor device fabrication and, more particularly, to acid-stop structures that can be used to stop acids and other etchants from leaking under a die that has been bonded to a wafer during processing of hybrid silicon-optical devices and have wavelength-independent low optical loss.

BACKGROUND

Waveguides are initially etched into an SOI wafer before being wafer bonded to a compound semiconductor die or wafer. The conventional technique that is used for preventing fluids from flowing down an etched waveguide channel is by temporarily blocking the channel at the edge of the region where the SOI wafer is bonded with the semiconductor die with, for example, photoresist or a mounting wax that is commonly used in the polishing-and-lapping industry. The conventional approach shows only moderate success in blocking fluids and is not suitable for high-volume manufacturing as implementation is too variable. A conventional fabrication processing of hybrid silicon-optical devices is illustrated in "Hybrid silicon evanescent device," A. W. Fang et al., *Materials Today*, Volume 10, Number 7-8, July 2007.

BRIEF DESCRIPTION OF THE DRAWINGS

Embodiments disclosed herein are illustrated by way of example, and not by way of limitation, in the figures of the accompanying drawings in which like reference numerals refer to similar elements and in which.

Figure 1:
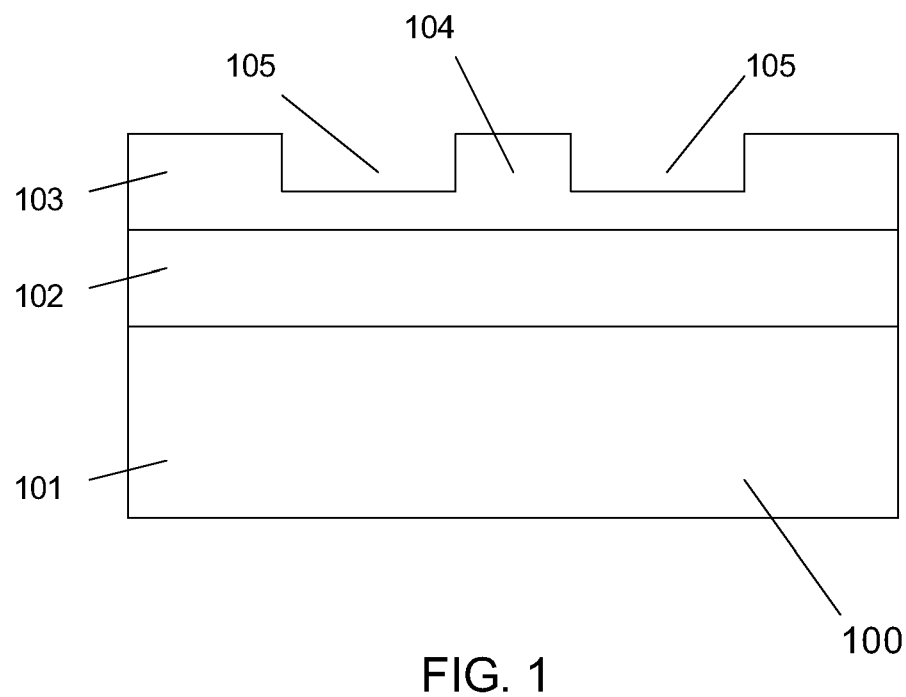
FIG. 1 depicts a cross-sectional schematic elevation view of an SOI wafer and a rib waveguide that has been etched into the SOI wafer in accordance with one or more embodiments.

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

Exemplary embodiments of acid-stop structures for hybrid silicon-optical devices are described herein. In the following description, numerous specific details are set forth to provide a thorough understanding of embodiments disclosed herein. One skilled in the relevant art will recognize, however, that the embodiments disclosed herein can be practiced without one or more of the specific details, or with other methods, components, materials, and so forth. In other instances, well-known structures, materials, or operations are not shown or described in detail to avoid obscuring aspects of the specification.

Reference throughout this specification to "one embodiment" or "an embodiment" means that a particular feature, structure or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments. Additionally, the word "exemplary" is used herein to mean "serving as an example, instance, or illustration." Thus, any embodiment described herein as "exemplary" is not to be construed as necessarily preferred or advantageous over other embodiments.

Various operations may be described as multiple discrete operations in turn, in a manner that is most helpful in understanding the claimed subject matter. The order of description however, should not be construed as to imply that these operations are necessarily order dependent. In particular, these operations need not be performed in the order of presentation. Operations described may be performed in a different order than the described embodiment. Various additional operations may be performed and/or described operations may be omitted in additional embodiments.

The subject matter disclosed herein relates to a structure that can be used to stop acids and other etchants from leaking under a die that has been wafer bonded to a wafer during processing of hybrid silicon-optical devices, and to a technique for making the structure. Moreover, the acid-stop structure disclosed herein provides a low optical loss that is wavelength-independent. Further, an acid-block structure according to the subject matter disclosed herein is highly repeatable, thereby making it suitable for high-volume manufacturing of hybrid silicon-optical devices that include lasers, optical amplifiers, optical modulators and photodetectors.

Figure 2:
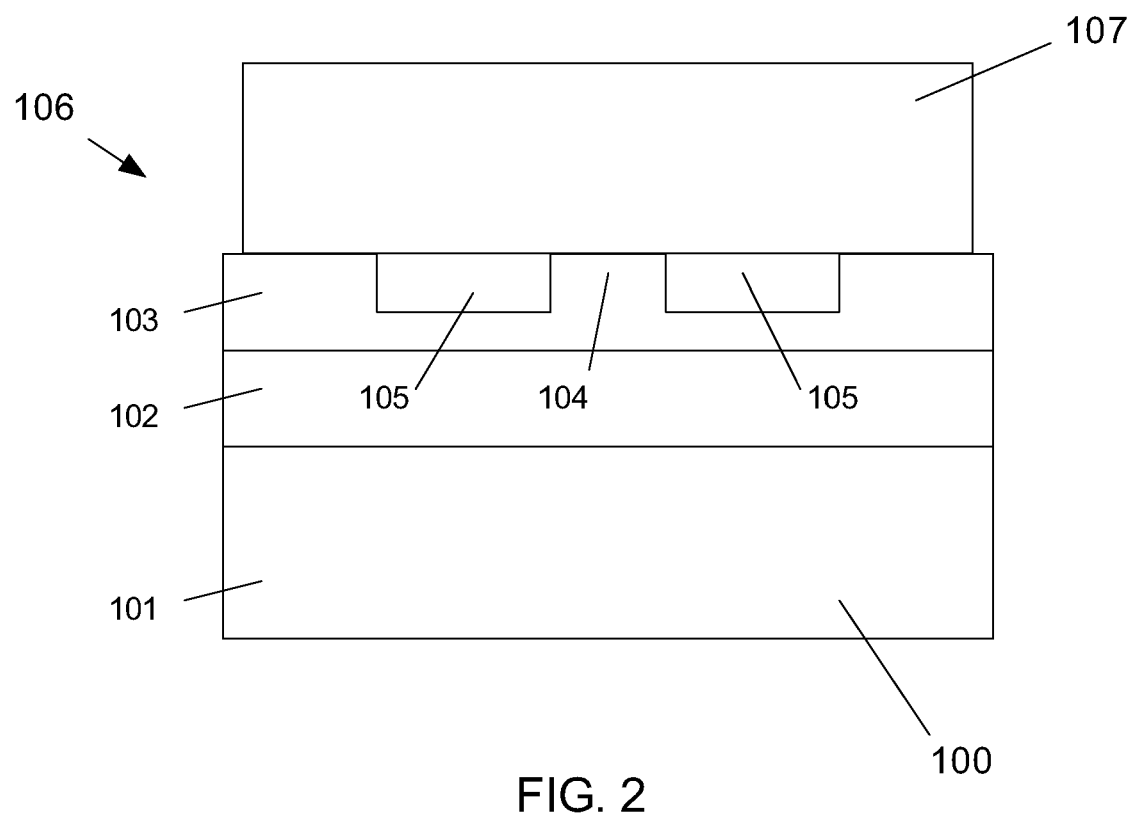
FIG. 2 depicts a cross-sectional schematic elevation view of a hybrid waveguide formed from a compound semiconductor die (or wafer) that has been wafer bonded to the SOI wafer shown in FIG. 1.
Figure 3:
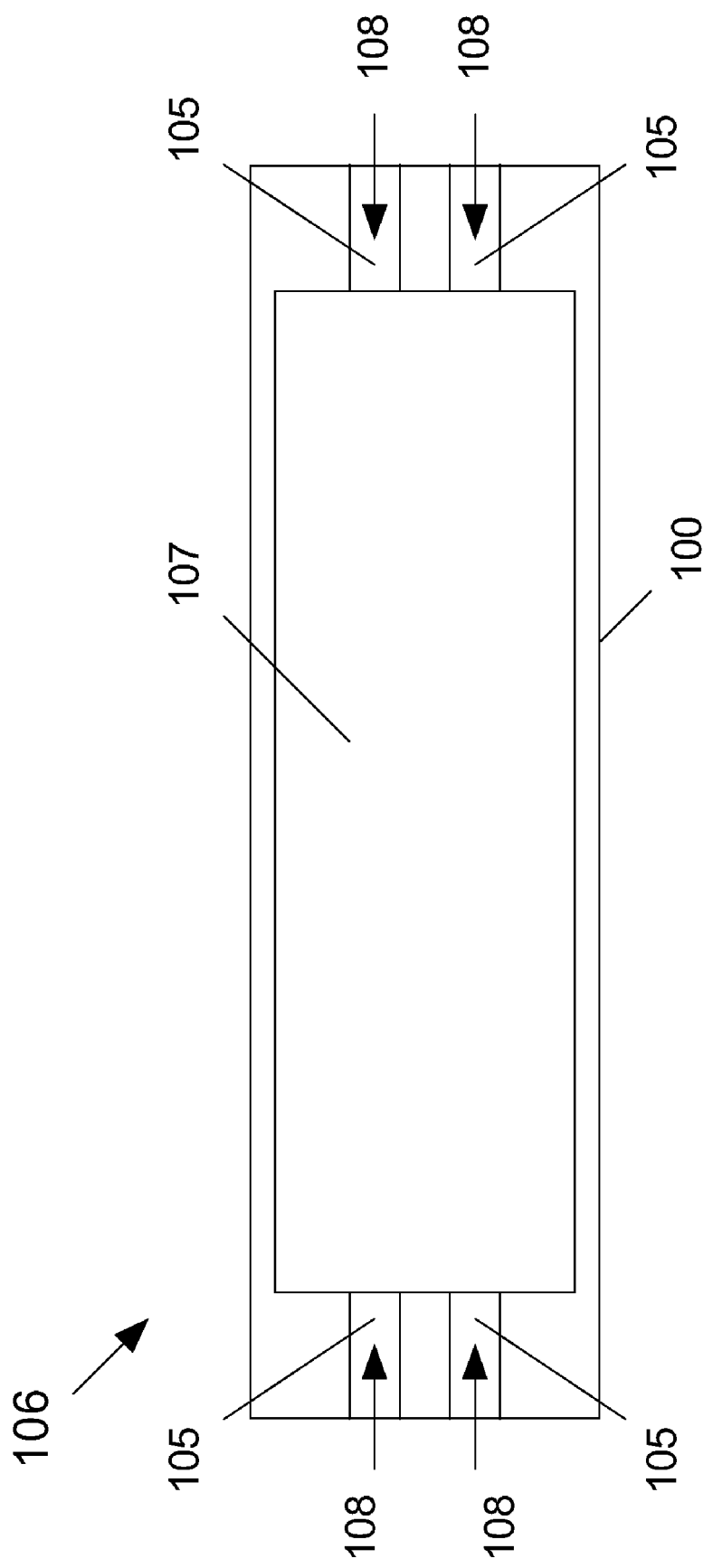
FIG. 3 depicts a schematic top view of the hybrid waveguide depicted in FIG. 2.

FIG. 1 depicts a cross-sectional schematic elevation view of an SOI wafer 100 and a rib waveguide 104 that has been etched into SOI wafer 100. SOI wafer 100 includes a silicon substrate portion 101, a silicon dioxide layer 102, and a silicon waveguide layer 103. Rib waveguide 104 is formed by etching rib channels 105 into silicon waveguide layer 103. FIG. 2 depicts a cross-sectional schematic elevation view of a hybrid waveguide 106 formed from a compound semiconductor die (or wafer) 107, such as a III-V semiconductor die, that has been wafer bonded to SOI wafer 100 of FIG. 1. FIG. 3 depicts a schematic top view of the hybrid waveguide 106 depicted in FIG. 2. After bonding, etched rib channels 105 in wafer 100 can act as capillary channels that allow liquids, such as etchants and acids, to flow underneath the compound semiconductor die 107, as indicated by arrows 108, during subsequent processing steps. The etchants and acids erode material from underneath die 107, which can eventually cause delamination of die 107 from SOI wafer 100. This can be particularly problematic during wet-etch process steps, such as during processing steps in which selected portions of the substrate of the die are removed.

Figure 4:
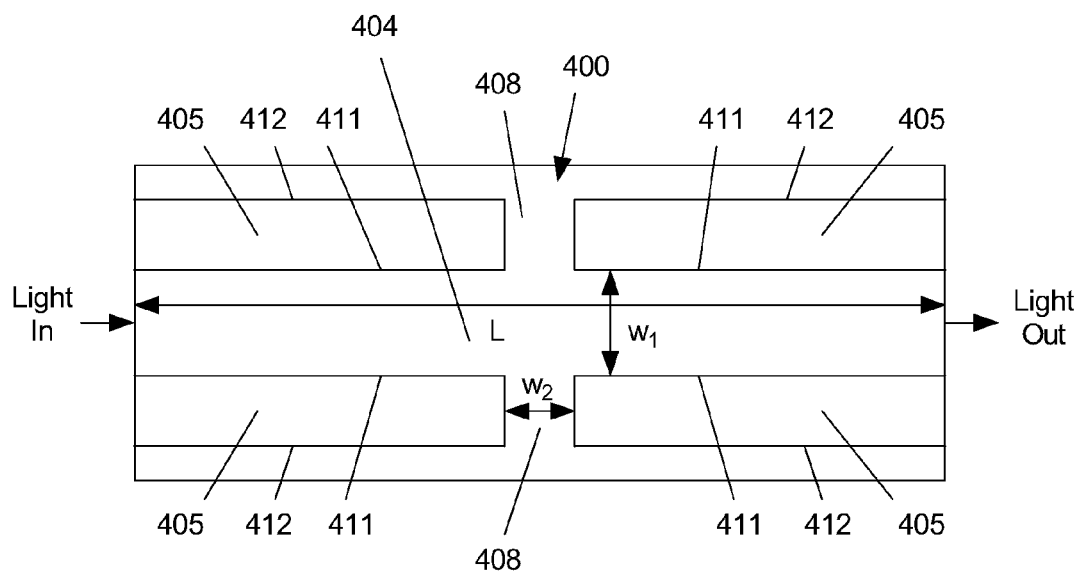
FIG. 4 depicts a schematic top view of a portion of an exemplary rib waveguide comprising an exemplary embodiment of an acid-block structure according to the subject matter disclosed herein.

FIG. 4 depicts a schematic top view of a portion of an exemplary rib waveguide comprising an exemplary embodiment of an acid-block structure 400 according to the subject matter disclosed herein. As depicted in FIG. 4, a rib waveguide 404 is formed between two rib channels 405, such as by etching rib channels 405 into an SOI wafer 401. Rib waveguide 404 extends in a direction along length L, and have a width $w_1$ that extends substantially perpendicular to length L Rib channels 405 extend in a direction along the length L of rib waveguide 404. In operation, light enters rib waveguide 404 at one end of the waveguide, propagates along length L of the waveguide, and exits the waveguide at the other end.

Each rib channel 405 comprises sidewalls 411 and 412. Sidewalls 411 are sidewalls of rib waveguide 404, and sidewalls 412 are opposite sidewalls 411. Acid-block structure 400 comprises an unetched fin structure 408 of silicon in each rib channel 405 that extends between sidewalls 411 and 412 of the rib channel. Each fin structure 408 is substantially the same height as the height of each of side walls 411 and 412 with respect to the bottom of each respective rib channel in order to block the flow of unwanted liquids along rib channels 405 and underneath a die (not shown in FIG. 4). While fin structures 408 are depicted as extending between sidewalls 411 and 412 in a substantially perpendicular manner, it should be understood that in another exemplary embodiment the unetched fin structures forming an acid-block structure could extend between the sidewalls of the rib channel in an oblique manner. Further, while fin structures 408 have been depicted as extending in a substantially straight manner between sidewalls 411 and 412, it should be understood that the fin structures forming an acid-block structure could extend between the sidewalls of a rib channel in a manner that is not substantially straight. Further still, it should be understood that the respective sidewalls of a rib channel could be formed to be of unequal heights with respect to the bottom of the rib channel, in which case, the fin structure forming an acid-stop structure would have a height that would be selected to seal the rib channel so that the flow of unwanted liquids would be blocked along the rib channels and underneath a die.

Figure 5:
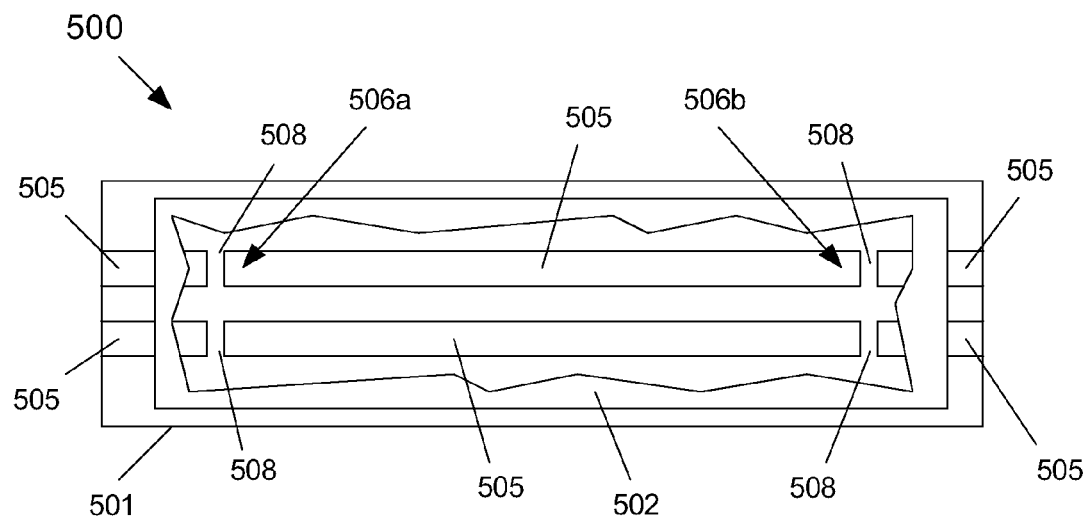
FIG. 5 depicts partial cutaway schematic top view of an exemplary embodiment of a hybrid waveguide that comprises acid-stop structures according to the subject matter disclosed herein.

FIG. 5 depicts partial cutaway schematic top view of an exemplary embodiment of a hybrid waveguide 500 that comprises acid-stop structures according to the subject matter disclosed herein. As shown in FIG. 5, hybrid waveguide 500 comprises an SOI wafer 501 and a III-V compound semiconductor die (or wafer) 502 that is shown as being partially cut away so that a portion of SOI wafer 501 is visible. A rib waveguide 504 has been formed in SOI wafer 501 by etching rib channels 505 into SOI wafer 501. Acid-block structures 506 have been formed as unetched fin structures 508 in each rib channel 505 during the same rib-etch step that forms rib waveguide 504. The region underneath die 502 that is between acid-block structures 506a and 506b is protected from unwanted liquids from flowing into rib channels 505. It should be understood that the acid-stop structures disclosed herein and the technique for forming an acid-stop structure are not limited for use with hybrid silicon-optical devices, but can be used with other types of semiconductor dies and wafer types.

Figure 6:
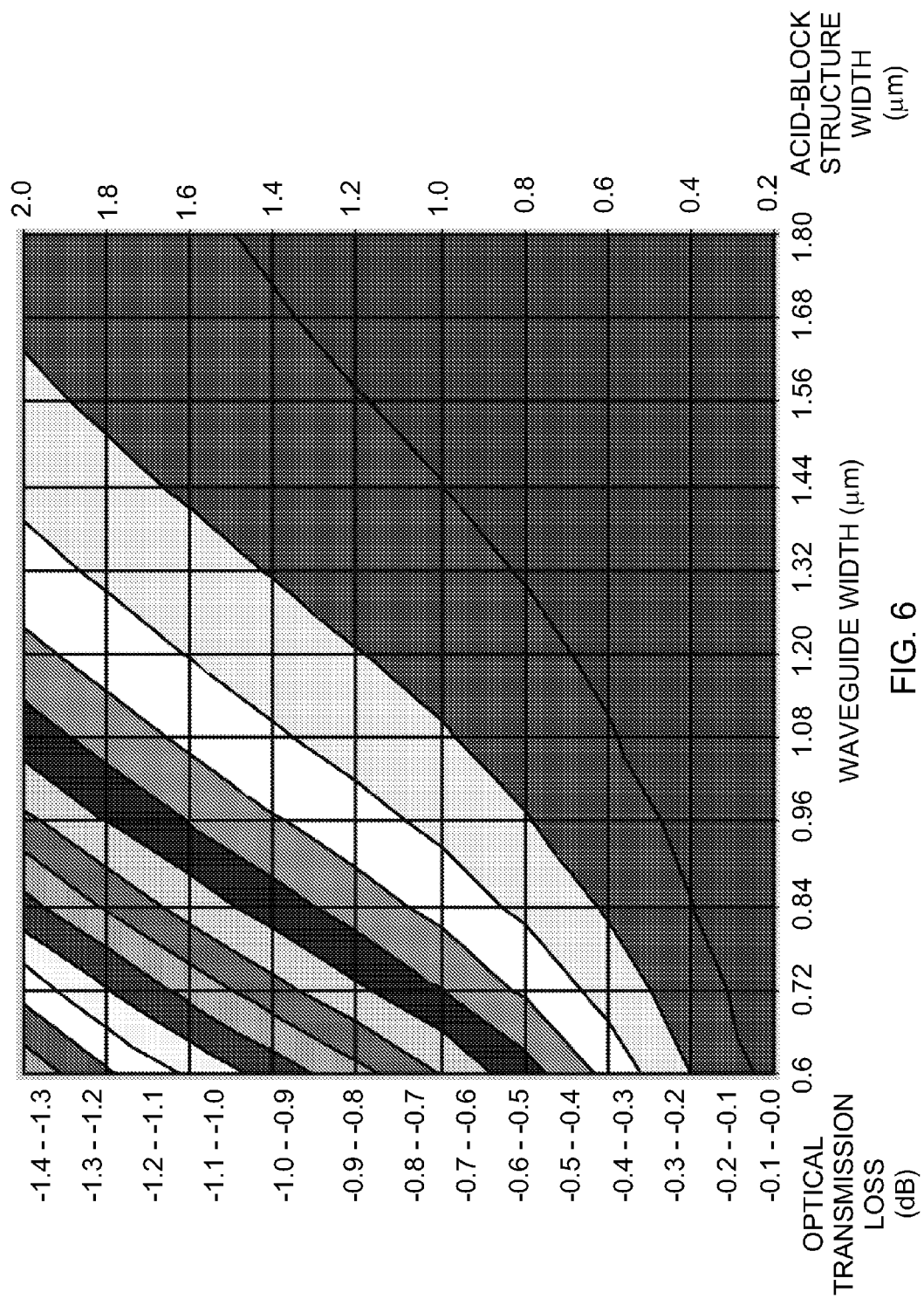
FIG. 6 is a graph that depicts the simulated optical transmission loss (in dB) that is associated with an acid-block structure as a function of waveguide width (in μm) and acid-block structure width (μm)

FIG. 6 is a graph that depicts the simulated optical transmission loss (in dB) that is associated with an acid-block structure as a function of waveguide width (in μm) and acid-block structure width (μm). In particular, waveguide width is shown along the bottom horizontal axis of FIG. 6, and is measured as $w_1$ as indicated in FIG. 4. Acid-block structure width is shown along the right vertical axis of FIG. 6, and is measured as $w_2$, as indicated in FIG. 4. Optical transmission loss was simulated using the beam propagation method and is shown in FIG. 6 along the left vertical axis as shaded bands that represent ranges of optical transmission loss. For example, for a waveguide comprising a width $w_1$ of 1.5 μm and an acid-block structure comprising a width $w_2$ of 1 μm, optical transmission loss is less than 0.1 dB. Additionally, FIG. 6 shows that for a waveguide comprising a width $w_1$ of about 0.60 μm and a fin structure width $w_2$ of about 2.0 μm, the optical transmission loss is less than or equal to about 1.4 dB.

Figure 7:
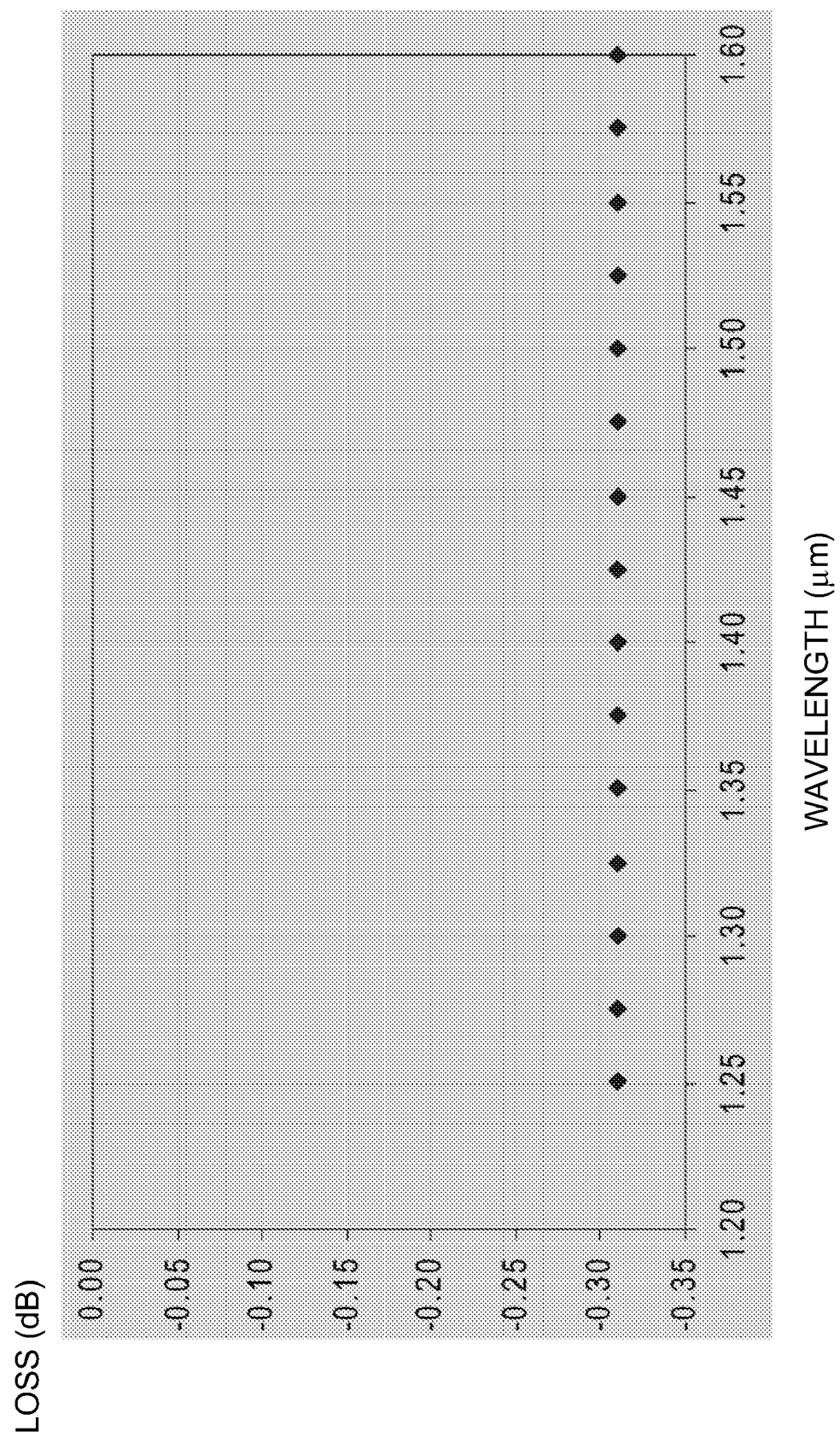
FIG. 7 is a graph showing a simulated optical transmission loss as a function of wavelength for an acid-block structure having a width $w_2$ that equals the waveguide width $w_1$.

FIG. 7 is a graph showing a simulated optical transmission loss as a function of wavelength for an acid-block structure having a width $w_2$ that equals the waveguide width $w_1$. More specifically, FIG. 7 shows the optical transmission loss for an acid-block structure having a width $w_2$ of 0.8 μm in a waveguide having a width $w_1$ of 0.8 μm. As shown in FIG. 7, no wavelength dependence is observed over a wavelength range of 350 nm from 1.25 μm to 1.60 μm.

Although the foregoing disclosed subject matter, including the Abstract, has been described in some detail for purposes of clarity of understanding, it will be apparent that certain changes and modifications may be practiced that are within the scope of the appended claims. Accordingly, the present embodiments are to be considered as illustrative and not restrictive, and the subject matter disclosed herein is not to be limited to the details given herein, but may be modified within the scope and equivalents of the appended claims.

What is claimed is:

1. A device, comprising:
  a waveguide comprising a rib structure between a first waveguide channel and a second waveguide channel, the first waveguide channel comprising a first sidewall and a second sidewall, the first sidewall of the first waveguide channel comprising a sidewall of the rib structure, the second waveguide channel comprising a first sidewall and a second sidewall, the first sidewall of the second waveguide channel comprising a sidewall of the rib structure, the rib structure comprising a first end, a second end, a length extending in a first direction along the rib structure and a width extending in a direction that is substantially perpendicular to the length, light entering the rib structure at the first end propagates along the rib structure and exits the rib structure at the second end;
  at least one fin structure formed between the first sidewall and the second sidewall of the first waveguide channel that comprises a height that is substantially equal to a height of the first sidewall and the second sidewall of the first waveguide channel and a width that extends substantially in a same direction as the width of the rib structure; and
  a fin structure formed between the first sidewall and the second sidewall of the second waveguide channel that corresponds to each fin structure formed between the first sidewall and the second side wall of the first wave guide channel, the fin structure formed between the first sidewall and the second sidewall of the second waveguide channel comprising a width that extends substantially in a same direction as the width of the rib structure,
  the at least one fin structure in the first waveguide channel and the corresponding fin structure in the second waveguide channel together comprising an optical loss that is less than or equal to about 1.4 dB for a rib structure width that is less than or equal to about 1.80 µm and a fin structure width that is less than or equal to about 2.0 µm.

2. The device according to claim 1, wherein the fin structure in the first waveguide channel and the corresponding fin structure in the second waveguide channel together comprise an optical loss that is less than or equal to about 0.7 dB for a rib structure width that is less than or equal to about 1.80 µm and a fin structure width that is less than or equal to about 1.0 µm.

3. The device according to claim 2, wherein the fin structure in the first waveguide channel and the corresponding fin structure in the second waveguide channel together comprise an optical loss that is less than or equal to about 0.2 dB for a rib structure width that is less than or equal to about 1.80 µm and a fin structure width that is less than or equal to about 0.4 µm.

4. The device according to claim 1, wherein the fin structure in the first waveguide channel and the corresponding fin structure in the second waveguide channel together comprise an optical loss that is less than or equal to about 1.4 dB for a wavelength between about 1.3 µm and about 1.6 µm.

5. The device according to claim 4, wherein the fin structure in the first waveguide channel and the corresponding fin structure in the second waveguide channel together comprise an optical loss that is less than or equal to about 0.35 db for a wavelength between about 1.3 µm and about 1.6 µm.

6. The device according to claim 1, wherein the rib structure and the waveguide channels are formed in a silicon-on-insulator substrate.

7. The device according to claim 6, further comprising a die bonded to the silicon-on-insulator substrate to form a hybrid silicon-optical device.

8. The device according to claim 7, wherein the die is a III-V die.

9. A hybrid optical device, comprising:
a silicon-on-insulator substrate comprising at least one waveguide, the waveguide comprising a rib structure between a first waveguide channel and a second waveguide channel, the first waveguide channel comprising a first sidewall and a second sidewall, the first sidewall of the first waveguide channel comprising a sidewall of the rib structure, the rib structure comprising a first end and a second end, light entering the rib structure at the first end propagates along the rib structure and exits the rib structure at the second end, the rib structure comprising a length extending in a first direction along the rib structure and a width extending in a direction that is substantially perpendicular to the length, and at least one fin structure formed between the first sidewall and the second sidewall of the first waveguide channel and comprising a width that extends substantially in a same direction as the width of the rib structure, the second waveguide channel comprising a first sidewall and a second sidewall, the first sidewall of the second waveguide channel comprising a sidewall of the rib structure, and at least one fin structure formed between the first sidewall and the second sidewall of the second waveguide channel, the at least one fin structure in the second waveguide channel corresponding to the fin structure in the first waveguide channel and comprising a width that extends substantially in a same direction as the width of the rib structure, the at least one fin structure in the first waveguide channel and the corresponding fin structure in the second waveguide channel together comprising an optical loss that is less than or equal to about 1.4 dB for a rib structure width that is less than or equal to about 1.80 µm and a fin structure width that is less than or equal to about 2.0 µm; and
a III-V die bonded to the silicon-on-insulator substrate, the III-IV die comprising circuitry coupled to at least one waveguide.

10. The device according to claim 9, wherein the fin structure in the first rib channel and the corresponding fin structure in the second rib channel together comprise an optical loss that is less than or equal to about 0.7 dB for a rib structure width that is less than or equal to about 1.80 µm and a fin structure width that is less than or equal to about 1.0 µm.

11. The device according to claim 10, wherein the fin structure in the first waveguide channel and the corresponding fin structure in the second waveguide channel together comprise an optical loss that is less than or equal to about 0.2 dB for a rib structure width that is less than or equal to about 1.80 µm and a fin structure width that is less than or equal to about 0.4 µm.

12. The device according to claim 9, wherein the fin structure in the first waveguide channel and the corresponding fin structure in the second waveguide channel together comprise an optical loss that is less than or equal to about 1.4 dB for a wavelength between about 1.3 µm and about 1.6 µm.

13. The device according to claim 12, wherein the fin structure in the first waveguide channel and the corresponding fin structure in the second waveguide channel together comprise an optical loss that is less than or equal to about 0.35 db for a wavelength between about 1.3 µm and about 1.6 µm.

14. A device, comprising:
a waveguide comprising a rib structure between a first waveguide channel and a second waveguide channel, the rib structure comprising a length extending in a first direction along the rib structure and a width extending in a direction that is substantially perpendicular to the length, the first waveguide channel comprising a first sidewall and a second sidewall, the first sidewall of the first waveguide channel comprising a sidewall of the rib structure, the second waveguide channel comprising a first sidewall and a second sidewall, the first sidewall of the second waveguide channel comprising a sidewall of the rib structure;
at least one fin structure formed between the first sidewall and the second sidewall of the first waveguide channel, the at least one fin structure formed between the first sidewall and the second sidewall of the first waveguide channel comprising a height that is substantially equal to a height of the first sidewall and the second sidewall, and comprising a width that extends substantially in a same direction as the width of the rib structure; and
at least one fin structure formed between the first sidewall and the second sidewall of the second waveguide channel, the at least one fin structure formed between the first sidewall and the second sidewall of the second waveguide channel comprising a height that is substantially equal to a height of the first sidewall and the second sidewall of the second waveguide channel, and comprising a width that extends substantially in a same direction as the width of the rib structure,
a fin structure in the second waveguide channel corresponding to the fin structure in the first waveguide channel, and the fin structure in the first waveguide channel and the corresponding fin structure in the second waveguide channel together comprising an optical loss that is less than or equal to about 1.4 dB for a rib structure width that is less than or equal to about 1.80 µm and a fin structure width that is less than or equal to about 2.0 µm.

15. The device according to claim 14, wherein the fin structure in the first waveguide channel and the corresponding fin structure in the second waveguide channel together comprise an optical loss that is less than or equal to about 0.7 dB for a rib structure width that is less than or equal to about 1.80 μm and a fin structure width that is less than or equal to about 1.0 μm.

16. The device according to claim 15, wherein the fin structure in the first waveguide channel and the corresponding fin structure in the second waveguide channel together comprise an optical loss that is less than or equal to about 0.2 dB for a rib structure width that is less than or equal to about 1.80 μm and a fin structure width that is less than or equal to about 0.4 μm.

17. The device according to claim 14, wherein the fin structure in the first waveguide channel and the corresponding fin structure in the second waveguide channel together comprise an optical loss that is less than or equal to about 1.4 dB for a wavelength between about 1.3 μm and about 1.6 μm.

* * * * *

UNITED STATES PATENT AND TRADEMARK OFFICE
CERTIFICATE OF CORRECTION

| | | |
|---|---|---|
| PATENT NO. | : 8,150,228 B2 | Page 1 of 1 |
| APPLICATION NO. | : 12/346779 | |
| DATED | : April 3, 2012 | |
| INVENTOR(S) | : Richard Jones et al. | |

It is certified that error appears in the above-identified patent and that said Letters Patent is hereby corrected as shown below:

In column 4, line 58-59, in claim 1, delete "wave guide" and insert -- waveguide --, therefor.

In column 5, line 26, in claim 5, delete "db" and insert -- dB --, therefor.

In column 6, line 29, in claim 13, delete "db" and insert -- dB --, therefor.

Signed and Sealed this
Tenth Day of July, 2012

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 8,150,228 B2 | Page 1 of 1 |
| APPLICATION NO. | : 12/346779 | |
| DATED | : April 3, 2012 | |
| INVENTOR(S) | : Richard Jones et al. | |

It is certified that error appears in the above-identified patent and that said Letters Patent is hereby corrected as shown below:

In the Specification

In column 1, line 5, following the Title and before "Technical Field" insert -- This invention was made with Government support under contract number H98230-08-3-0011 awarded by the Department of Defense. The Government has certain rights in this invention. --.

Signed and Sealed this
Twentieth Day of October, 2015

Michelle K. Lee
*Director of the United States Patent and Trademark Office*